United States Patent
Woods et al.

(10) Patent No.: US 10,817,955 B2
(45) Date of Patent: Oct. 27, 2020

(54) SELECTIVE RENDERING OF ALTERNATING IMAGES ON A GRAPHICAL USER INTERFACE

(71) Applicant: Hartford Fire Insurance Company, Hartford, CT (US)

(72) Inventors: Christine A. Woods, Plantsville, CT (US); Cynthia A. Hellyar, Avon, CT (US); Sandra E. Belcourt, Hamden, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 121 days.

(21) Appl. No.: 16/229,887

(22) Filed: Dec. 21, 2018

(65) Prior Publication Data

US 2019/0114718 A1    Apr. 18, 2019

Related U.S. Application Data

(63) Continuation of application No. 15/822,596, filed on Nov. 27, 2017, now Pat. No. 10,163,168, which is a continuation of application No. 14/053,131, filed on Oct. 14, 2013, now Pat. No. 9,830,661.

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ........................................ G06Q 40/08
USPC .......................................... 705/4
See application file for complete search history.

(56) References Cited

U.S. PATENT DOCUMENTS

| 5,191,522 | A | 3/1993 | Bosco et al. |
| 7,945,458 | B1 | 5/2011 | Jackson |
| 8,527,306 | B1 | 9/2013 | Reeser et al. |
| 8,577,699 | B1 * | 11/2013 | Diener .......... G06Q 40/08 705/1.1 |

(Continued)

FOREIGN PATENT DOCUMENTS

WO    2013074062 A1    5/2013

OTHER PUBLICATIONS

Slania, John T. "Chain reactions expand operator liability", Crain's Chicago Business; Chicago, vol. 24, Iss. 35. (Year: 2001).*
Insurance Coverage for Building Code Upgrades, Johnson S.G., Tort Trial & Insurance Practice Law Journal; Spring/Summer 2009 (44:3-4).

(Continued)

*Primary Examiner* — Edward Chang
(74) *Attorney, Agent, or Firm* — Howard IP Law Group, PC

(57) ABSTRACT

A system provides on a graphical user interface user-selectable options corresponding to a first type and a second type of enhanced coverage options, available for a covered property, each of the enhanced coverage options providing one or more improvements to a property covered under a property insurance policy, in accordance with universal design principles, in the event of an incurred loss to the covered property. Responsive to user selection of a type, alternating images including an image of a damaged property and an image of the damaged property after repair and an improvement in accordance with universal design principles corresponding to the selected type of enhanced coverage option, are displayed.

20 Claims, 10 Drawing Sheets

(56) References Cited

U.S. PATENT DOCUMENTS

| | | |
|---|---|---|
| 2002/0194014 A1 | 12/2002 | Starnes et al. |
| 2003/0025424 A1 | 2/2003 | Graves |
| 2003/0141126 A1 | 7/2003 | Hays et al. |
| 2004/0111300 A1 | 6/2004 | Callen et al. |
| 2005/0187778 A1 | 8/2005 | Mitchell |
| 2006/0258181 A1 | 11/2006 | Holland |
| 2008/0189166 A1 | 8/2008 | Brooks |
| 2009/0055226 A1* | 2/2009 | Tritz .................. G06Q 30/0283 705/4 |
| 2009/0055329 A1 | 2/2009 | Catania et al. |
| 2013/0097201 A1 | 4/2013 | Brydon et al. |
| 2013/0290052 A1 | 10/2013 | Settino |
| 2013/0304674 A1 | 11/2013 | Isaacs |
| 2014/0081667 A1 | 3/2014 | Joao |

OTHER PUBLICATIONS

Young, Leslie C., "Residential Rehabilitation, Remodeling and Universal Design", The Center for Universal Design, NC State University College of Design, http://www.ncsu.edu/ncsu/design/cud/, 2006, 27 pages.

AARP, "What is Universal Design?", http://www.aarp.org/home-garden/home-improvement/info-09-2009/what_is_universal_design.html, Sep. 30, 2009, 2 pages.

National Association of Home Builders, "What is Universal Design?" http://www.nahb.org/generic.aspx?genericContentID=89934, Apr. 6, 2012, 1 page.

Chubb Offers Coverage to Upgrade Green After Home Loss, Insurance Journal, http://www.insurancejournal.com/news/national/2009/02/24/98155.htm, Feb. 24, 2009, 1 page.

\* cited by examiner

| Property Identification | Enhanced Coverage Option | Enhanced Coverage Limit | Base Coverage | Deductible | Available Enhanced Coverage Amount | Applicable Annual Premium |
|---|---|---|---|---|---|---|
| 123 Main Street | D_2 | $500 | $10,000 | $500 | $500 | $10 |
| 5 Grove Ave | D_1 | $750 | $20,000 | $500 | $300 | $15 |
| 321 Pleasant Way | C_1 | $1000 | $50,000 | $1000 | $1000 | $17 |
| 567 Hartford Ave | B_1 | $2500 | $25,000 | $500 | $0 | $44 |
| 12 High Way | A_1 | $5000 | $40,000 | $0 | $2325 | $89 |

FIG. 10

SELECTIVE RENDERING OF ALTERNATING IMAGES ON A GRAPHICAL USER INTERFACE

CROSS REFERENCE TO RELATED APPLICATIONS

The present application is a continuation of co-pending U.S. patent application Ser. No. 15/822,596, which claims priority to and benefit of U.S. patent application Ser. No. 14/053,131, filed Oct. 14, 2013, now U.S. Pat. No. 9,830,661, the contents of each of which are hereby incorporated herein by reference in their entirety for all purposes.

BACKGROUND

As life spans increase and the aging population grows larger, many people are opting out of traditional nursing home or retirement home situations and opting to remain in their homes as they age. Persons 65 years or older currently number more than 40+ million represented approximately 13% of the U.S. population, or about one in every eight Americans. By 2030, there will be about 72.1 million older persons, more than twice their number back in 2000. People 65+ represented 12.4% of the population in the year 2000 but are expected to grow to be 19% of the population by 2030.

Research has shown that 50% of so called Boomers and 72% of adults age 50+ want to "live in place" meaning that they would prefer to retire in their current homes rather than moving to more conventional retirement home facilities. However, most current homes are not designed for the needs of the aging, elderly and/or impaired and independently upgrading such homes is generally impractical and expensive. Ideally, it would be beneficial to meet aging needs/improvements before a health or aging need crisis occurs such as a health need affecting mobility or dexterity.

Accordingly, it would be desirable to have a way to upgrade and improve homes and businesses to make them more accessible, useable and sustainable so that occupants will have the benefit of a greater quality of life over an extended time period.

SUMMARY

In one embodiment, the present invention is a system for providing enhanced coverage options for a base homeowners insurance policy, the system comprising: one or more processors; a memory coupled to the one or more processors; and one or more programs, wherein the one or more programs are stored in the memory and configured to be executed by the one or more processors, the one or more programs including instructions for: providing an enhanced coverage option selection screen on a graphical user interface, each enhanced coverage option providing, responsive to a loss covered under the base homeowners insurance policy and affecting a room of the home covered under the base homeowners insurance policy, upgrade coverage based on universal design principles for the affected room; receiving an enhanced coverage option selection from the graphical user interface; storing the enhanced coverage option selection in a storage device; determining a premium for the enhanced coverage option selection; and communicating, via a communications network, the determined premium for the enhanced coverage option selection to a user.

In other embodiments, the present invention is a computer system for providing universal design based enhanced coverage options to a current or future policyholder, comprising: one or more processors; and a memory storage device in communication with the one or more processors. The one or more processors are configured to: provide a display of a plurality of enhanced coverage options, wherein the display includes one or more enhanced coverage examples for display, each of the enhanced coverage options providing for improvements in accordance with universal design principles responsive to a covered loss; receive via a computer communications network user data related to a enhanced coverage option selection; store the enhanced coverage option selection in the memory storage device; determine, based on the enhanced coverage option selection, a premium associated with the enhanced coverage option selection; and transmit the determined premium information related to the enhanced coverage option selection to the current or future policyholder.

In other embodiments, the present invention is a computer-implemented method for administering property and casualty insurance policies, the policies having enhanced coverage for providing one or more enhancements in accordance with universal design principles in the event of an incurred loss to a covered property, comprising: providing, via a graphical user interface, a display of enhanced coverage options available for a covered property; receiving, via a computer communications network, a user selected enhanced coverage option made via the graphical user interface; storing the enhanced coverage option selection in a database associated with an insurance entity; determining, by a computer processor, a premium associated with the enhanced coverage option selection; and transmitting, by the computer communications network, the determined premium information related to the enhanced coverage option selection for display on the graphical user interface.

In other embodiments, the present invention is a system for managing insurance claims associated with property upgrades for an insured property to provide upgrades in accordance with universal design principles to an affected room of an insured property, comprising: a data storage device for storing data associated with a property insurance information database; a computer processor configured to execute program instructions and to retrieve the data associated with the property insurance information database from the data storage device; and a memory, coupled to the computer processor, storing program instructions for execution by the computer processor to: receive, from a remote user, property insurance data submitted electronically in connection with a loss event related to the insured property, the insurance data including data identifying a room affected by the loss event; determine if the loss event qualifies for the upgrade, the determining including determining whether the affected room is a room type eligible for an upgrade; responsive to determining that the loss event qualifies for the upgrade, communicate to the remote user that the user is eligible for the upgrade; receive upgrade expense information from the remote user; validate the upgrade expense information from the remote user, the validating including determining whether the upgrade expense information is indicative of an upgrade in accordance with universal design principles; and responsive to determining in the validating that the upgrade expenses of the upgrade expense information are covered, provide a payment for the validated upgrade expense subject to an upgrade coverage limit and exhaustion of a base coverage amount for the loss event.

In other embodiments, the present invention is a computer-implemented method associated with a property insurance claims process for administering enhanced coverage options based on better living design principles, comprising receiving, via a communications network, insurance claims data submitted via a remote user device; verifying, by a processor, the submitted insurance claims data qualify for enhanced coverage enhancement based at least in part on information stored in an insurance property enhanced coverage database; receiving, via the communications network, additional insurance claims data related to the enhanced coverage enhancement from the remote user device; determining an approved payment amount, by a processor, the payment amount related to the enhanced coverage upgrade; and transmitting payment data to the remote user device via the communications network.

In other embodiments, the present invention is a non-transitory computer-readable medium storing instructions adapted to be executed by a computer processor to perform an insurance claims based method related to administering improvement coverages for an insured property, said method comprising: receiving, from an insured, property loss data submitted via a web based claims sub-system; validating the submitted property loss data to determine whether the property is eligible for improvement coverage; communicating to the insured, an improvement coverage amount once the submitted property loss data is determined to be eligible; and providing payment to the insured for the improvement coverage amount, wherein the upgrade coverage amount is above an amount allocated for indemnification of the property loss.

BRIEF DESCRIPTION OF THE DRAWINGS

A more detailed understanding may be had from the following description, given by way of example in conjunction with the accompanying drawings wherein:

FIG. 10 shows an excerpt from an exemplary database of an illustrative embodiment of the present invention.

DETAILED DESCRIPTION

Figure 1:
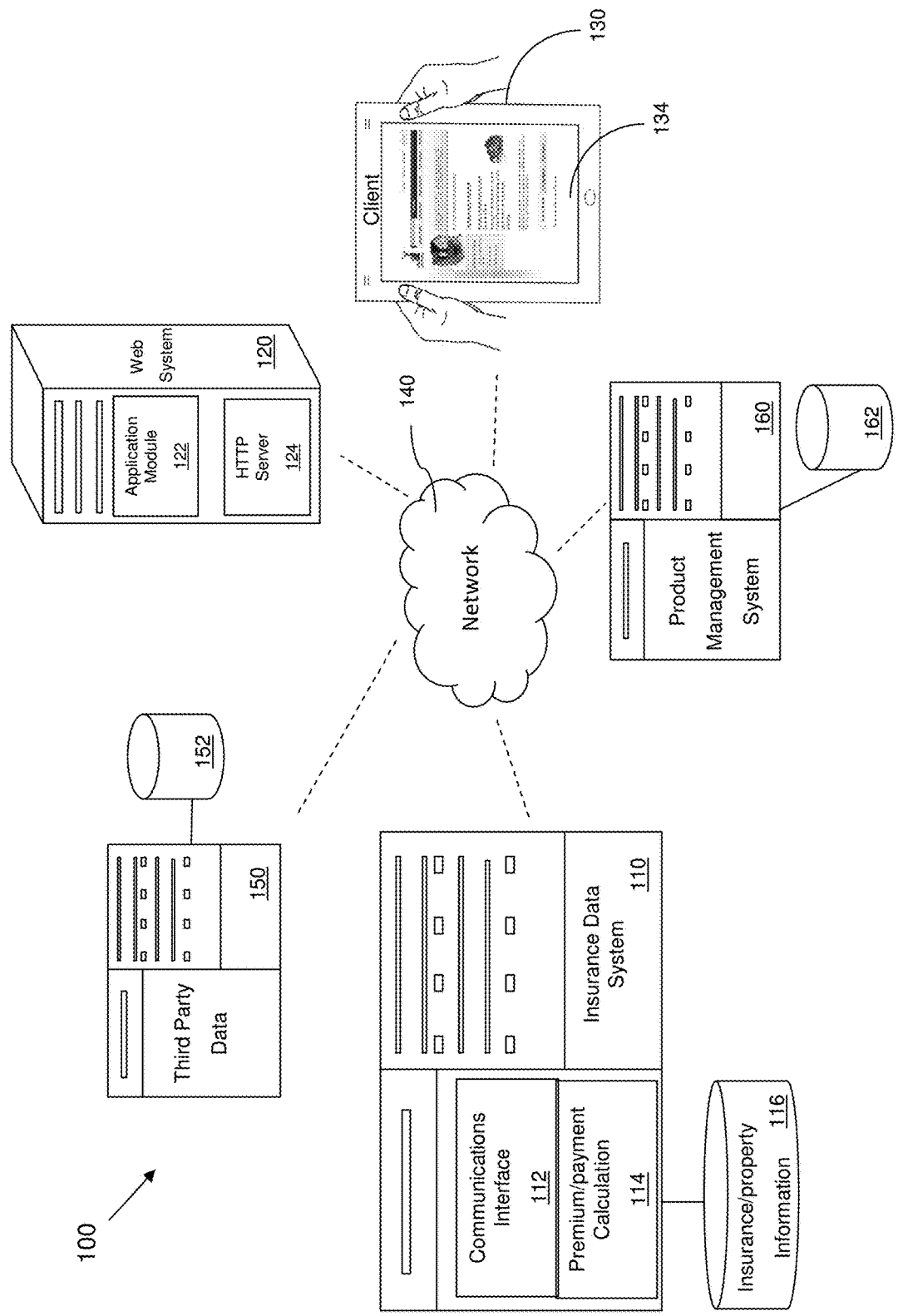
FIG. 1 shows an exemplary computer architecture that may be used for insurance quote administration and management.

Disclosed herein are processor-executable methods, computing systems, and related technologies for the administration, management and communication of insurance coverage options, including in embodiments the administration, management and communication of an enhanced property based coverage quotation for providing enhancements and improvements to a policyholder's home or business. Using this enhanced property based coverage, policyholders would be able to upgrade their properties, such as home kitchens or bathrooms, to improve the comfort, convenience and flexibility that extends beyond the room's original condition before a loss occurred. For example, improvements such as task lighting, easy grip door handles or faucets, pull out shelves in cabinets, grab bars or other elements that improve accessibility or safety would be covered as part of this replacement plus type of optional coverage. In embodiments, in the event of a covered loss to the kitchen or bathroom of an insured property, this enhanced coverage would allow the policyholder to upgrade any part, or selected parts or fixtures, of the damaged room with universal design features and not be limited to upgrading or improving the area of the room that was damaged, or fixtures or appliances that were damaged, in the underlying covered loss.

While most products and environments are designed for the average user, universal design or better living design involves the specific design of products and environments to be usable by all people, to the greatest extent possible, without the need for adaptation or specialized design. As used herein, the term "universal design" or "better living design" are used interchangeably to refer to the design of a product or environment that involves the consideration of a variety of factors, which may include two or more of ergonomics, aesthetics, engineering options, environmental issues, industry standards, safety concerns, and cost, so that the product or environment may be used to the greatest extent possible. For example, a standard height and width door is not accessible to everyone but if the door is widened and a large doorknob is installed, the door becomes accessible to more people, including some wheelchair users. The application of universal design principles universally leads to the making of homes and other buildings accessible to everyone including a small person, a large person, a young person, an elderly woman, and an able-bodied person as well as a person using a walker or wheelchair among others.

Utilizing embodiments of the present invention, an applicant or policyholder can select a so-called "enhanced" or "better living" option for a property insurance policy and then use this optional coverage endorsement to cover an upgrade or modification in accordance with universal design or better living design, that is better suited to their needs including but not limited to: widening doorways, installing reachable controls and switches, installing easy-to-use handles and switches such as lever-style door handles and faucets, and rocker light switches, raised front-loading dishwashers, side-by-side refrigerators, easy-access kitchen storage such as adjustable-height cupboards and lazy Susans, low or no-threshold stall showers with built-in benches or seats, non-slip floors, bathtubs, and showers, raised, comfort-level toilets, multi-level kitchen countertops with open space underneath, windows that require minimal effort to open and close, task lighting directed to specific surfaces or areas and easy-to-grasp D-shaped cabinet pulls.

FIG. 1 shows an example architecture 100 that may be used for the administration and management of enhanced coverage policy options in an illustrative embodiment of the present invention. The enhanced coverage options may be used by a policyholder to cover better living design or universal design upgrades including but not limited to grab bars in the bathroom, single handle faucets, overhead lighting, non-slip flooring, step-in bathtubs, comfort height toilets, etc. that will enhance the quality of life for the policyholder and family members of the policyholder. The enhanced coverages are for features and improvements that will make a property, such as a kitchen or bath in the property, more comfortable, safer, and more usable for homeowner needs. The enhanced coverages will benefit people with special needs, small children, the elderly, the handicapped, etc. The example architecture 100 may include an insurance data system 110, a web system 120, a client device 130, a network 140, a third party data management system 150 and a product management system 160. Third party data management system 150 may also include a database 152. In the example architecture 100 of FIG. 1, the insurance data system 110 and the product management system 160 may be under the control of an insurance/financial services company and their associated agents/brokers. In other embodiments, insurance data system 110 may be integrated with product management system 160, with both insurance data system 110 and product management system 160 being under the control of an insurance entity.

Referring still to FIG. 1, the insurance data system 110 may include a communications interface module 112, a premium/payment calculation module 114, and an insurance/property information database 116. The enhanced coverage premium calculation module 114 may include one or more software modules or objects and one or more specific-purpose processor elements to perform the calculations and processing required by embodiments of the present invention such as for calculating the premium for the enhanced coverage options. In some embodiments, the enhanced coverage premium calculation module 114 may also include one or more business rules and one or more predictive models. The business rules may provide guidelines on how to rate and quote individuals and entities based on certain types of underwriting related information and how to calculate premiums, claims payments and other related calculations. Other business rules may be implemented in accordance with embodiments of the present invention. The premium/payment calculation module 114 may include or access one or more look-up tables that correlate premium rates to one or more factors.

In operation, the enhanced coverage premium/payment calculation module 114 may receive client or customer data related to home insurance, business insurance and automobile insurance such as an address of individual, specific property items, etc. provided through client device 130 of an illustrative embodiment of the present invention. The enhanced coverage premium/payment calculation module 114 may also receive or access certain third party data, such as tax, appraisal, town, social network information, as well as other third party sources of information. The enhanced coverage premium/payment calculation module 114 may also receive enhanced coverage option selections such from a graphical user interface 134 displayed on client device 130.

Enhanced coverage premium/payment calculation module 114 in conjunction with product management system 160 may also output one or more quotations for one or more insurance products having enhanced coverage options such as home, business or automobile insurance for review and approval by the user. The quotations may take into account the user's inputs provided, social network data related to the user and the characteristics of the insurance product.

The insurance/property information database 116 may store information such as the user provided input, insured property information, premium allocation information, universal design information and better living design information, social network information, and third party data information related to the user/applicant and insured property and property the subject of an application for insurance. Insurance information database 116 may include data stored in one or more computer-readable storage media, and may be or include one or more relational databases, hierarchical databases, object-oriented databases, one or more flat files, one or more spreadsheets, and/or one or more structured files. Insurance/property information database 116 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance data system 110 and the other elements in the example architecture 100 of FIG. 1 may be performed via the communications interface module 112 interacting with network 140. The insurance data system 110 may also access third party systems and third party data, not shown, which may include town property information, business data, social network history and activity and other sources of information which may impact the insurance determinations and transactions herein via network 140. For example, insurance data system 110 may interface with computer systems associated with one or more third party sites to receive data related to client 130 such as the applicant's housing characteristics, habits, risk profiles, and interests. For example, third party sites may include e-commerce sites, utility provider sites, automobile sites, real estate sites, universal design related sites and other variety of sites in the Internet.

Referring still to FIG. 1, the product management system 160 may perform functionality such as storing and processing information related to certain insurance products and coverages such as home insurance, automobile insurance and commercial/business insurance. For example, the product management system 160 may include information on certain types of insurance products and product/coverage options such as the product characteristics, benefits, features, deductibles, limits, etc. The product management system 160 may store this information in a product management database 162. The product management database 162 may also include data stored in one or more computer-readable storage media, and may be or include one or more relational databases, hierarchical databases, object-oriented databases, one or more flat files, one or more spreadsheets, and/or one or more structured files. As will be described in further detail below, the insurance data system 110 may use information from the product management database 162 to select and purchase or sell potential products and coverages which may be suitable for one or more clients or customers based on their information and needs.

Referring still to FIG. 1, a web site system 120 may provide a web site that may be accessed directly by a consumer operating a user client device 130. User client device 130 can include, but is not limited to cellular telephones, other wireless communication devices, personal digital assistants, pagers, laptop computers, tablet computers, smartphones, or combinations thereof. A user client device 130 may be part of a system or network of a third party, such as an insurance agency system, agency management system, or a financial advisor system, as well as consumer devices. In the illustrative embodiment of the present invention, user client device 130 may communicate with the web site system 120 that may be operated by or under the control of an insurance entity or other third party entity such as an outsourced type entity or third party administrator type entity. The web site system 120 may generate one or more web pages for access by client device 130, and may receive responsive information from the client device 130 such as user information for obtaining an insurance quotation for a home policy having enhanced coverage option(s). The responsive information may include information that identifies the user, information related to the product(s) that the user is viewing, purchasing or requesting, and/or other related types of information. The web site system 120 may then communicate this information to the insurance management system 110 for processing via communications interface 112. The web site system 120 may also communicate one or more web pages to the client device 130 that provide one or more product options that may be suitable for the user from the product management system 160.

In operation, client device 130 may be used to approve and/or select one or more of the product coverages, products and/or options in accordance with their needs. Selection via client device 130 may be accomplished via a touch-sensitive touch screen that provides an input interface and an output interface between the client device 130 and the client or user. The client device 130 displays visual output to the user for manipulation by the user. The visual output may include checkboxes, radio buttons, graphics, text, icons, video, and any combination thereof. The touch screen may display one or more graphics within the user interface displayed on device 130. In this embodiment, as well as others, a user may select one or more of the graphical elements by making contact or touching the graphics, for example, with one or more fingers or stylus implements.

The web site system 120 may include an insurance web application module 122 and a HyperText Transfer Protocol (HTTP) server module 124. The web application module 122 may generate the web pages that make up the web site and that are communicated by the HTTP server module 124. The insurance web application module 122 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 124 may implement the HTTP protocol, and may communicate HyperText Markup Language (HTML) pages and related data from the web site to/from the consumer client device 130 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy.

Referring still to FIG. 1, the client device 130 may include a web browser module 134, which may communicate data related to the web site to/from the HTTP server module 124 and the insurance web application module 122 in the web site system 120. The web browser module 134 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the client device 130, such as a liquid crystal display (LCD) display, organic light-emitting diode (OLED) display, touch screen or monitor. The client device 130 may receive input from the user of the client device 130 from input devices (not depicted) that are included in or connected to the client device 130, such a mouse or other pointing device, or a touch screen, and provide data that indicates the input to the web browser module 134.

The example architecture 100 of FIG. 1 may also include one or more wired and/or wireless networks within network 140 via which communications between the elements 110, 120, 130, 150 and 160 in the example architecture 100 may take place. The networks may be private or public networks, and/or may include the Internet. In one example deployment scenario, the insurance data system 110, web site system 120, third party system 150 and product management system 160 may communicate via one or more private networks that are under the control of the financial services/insurance company, while the client device 130 may communicate with the web site system 120 via the Internet.

Each or any combination of the modules 112, 114, 122, and 124 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112, 114, 122, and 124 may perform functionality described later herein.

Figure 2:
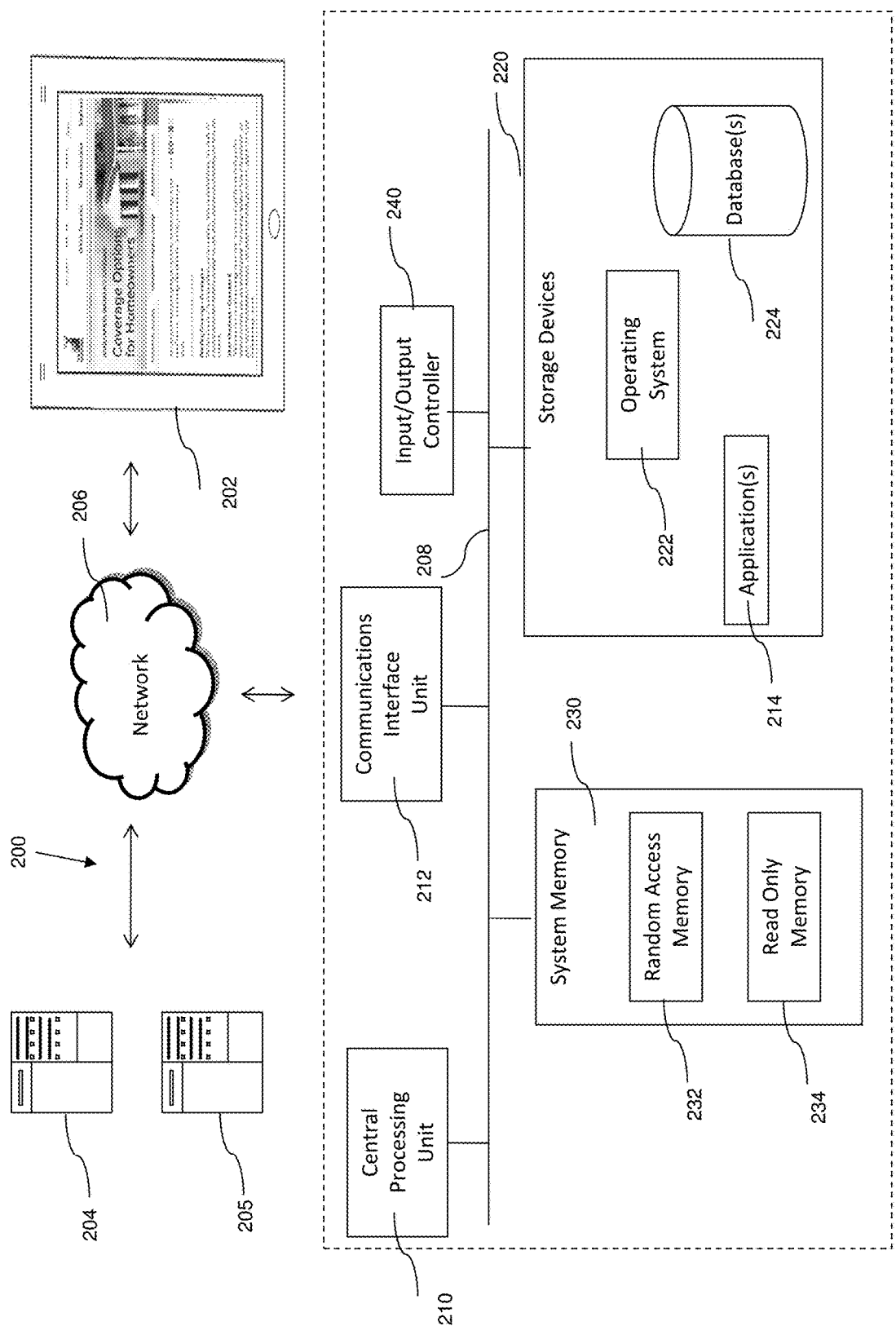
FIG. 2 shows an exemplary system that may be used for the management of insurance quotations.

Referring to FIG. 2, an exemplary computer system 200 for use in an illustrative embodiment of the invention will now be described. Computer system 200 may be configured to perform insurance processing and management for one or more users, clients or customers 202 related to one or more enhanced coverage options. System 200 may interface with a insurance company system 204 and a third party system 205 via a network 206. In an illustrative embodiment of the present invention, insurance company system 204 is responsible for the policy functions associated with customer 202 and third party system 205 may be associated with one or more quoting, claims processing, underwriting or other related functions associated with management of the enhanced coverage options of embodiments of the present invention. In computer system 200, a central processing unit or processor 210, which may include one or more processors, executes instructions contained in one or more programs such as insurance management application program 214, stored in one or more memories, such as storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 208 and/or other data channels, with communications interface unit 212, storage devices 220, system memory 230, and input/output controller 240. System memory 230 may further include a random access memory 232 and a read only memory 234. Random access memory 232 may store instructions in the form of computer code provided by application 214 to implement embodiments of the present invention. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from storage devices 220, which may include connecting to storage devices 220 and obtaining data or reading data from the storage devices, or place data into the storage devices. Storage devices 220 may include local and network accessible mass storage devices. Storage devices 220 may include media for storing operating system 222 and mass storage devices such as storage 224 for storing data related to insurance information related to the customers such as property information, claims history, universal design considerations, etc. Communications interface unit 212 may communicate via network 206 with other financial services/insurance company computer systems such as insurance company system servers 204 as well as other servers, computer systems of agents, financial advisors, customers, remote sources of data, and with systems for implementing instructions output by processor 210. Insurance services company server 204 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP. Network 206 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of embodiments of the present invention, including computation of a premium for transmission to a user/application. Cloud based computing may be used herein to handle any one or more of the application, storage and connectivity requirements of embodiments of the present invention. Furthermore, any suitable data and communication protocols may be employed to implement embodiments of the present invention.

With reference still to FIG. 2, communications interface 212 is used for receiving user data related to the user's insurance requirement and background. Computer processor 210 executes program instructions, such as provided by the application 214 to receive, via the communications interface 212, third party data, social network data and other related information. Database 224 may include transaction data such as historical data from the user or other third parties.

Figure 3:
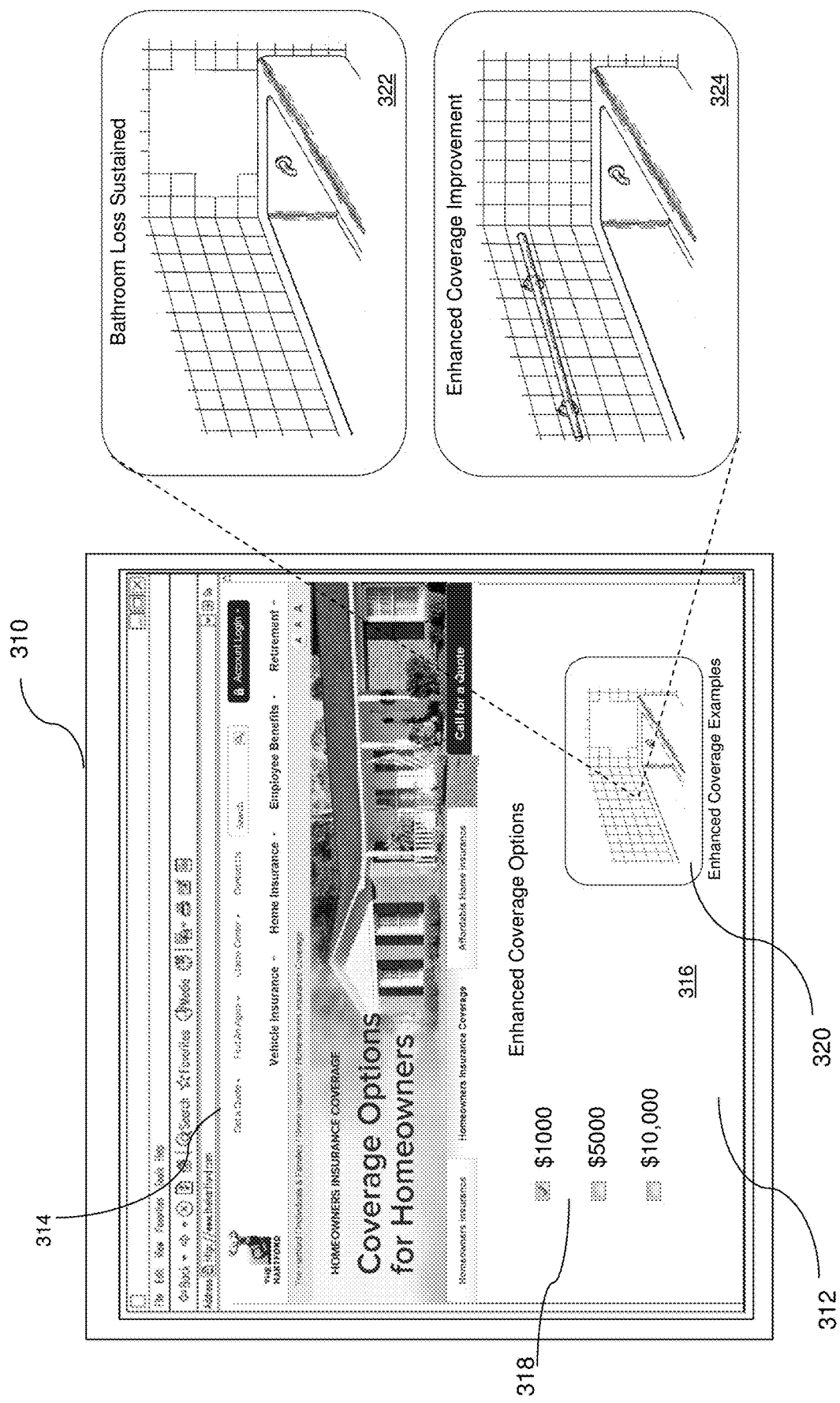
FIG. 3 shows an exemplary system screen of an illustrative embodiment of the present invention.

FIG. 3 illustrates an exemplary screen of an illustrative embodiment of the present invention as may be displayed among devices shown in FIGS. 1 and 2. In one embodiment, a user operates a device 310, such as a portable computing device for viewing and accessing information and data related to an insurance policy as described herein. Portable computing device may include a touch screen 312 that can be an active sensor employing capacitive, resistive, inductive, or other methods, or it can be a passive surface on which touch sensing is accomplished by optical, acoustic, or other similar methods. Device 310 can also be a liquid crystal display (LCD), organic light emitting diode (OLED) display, electroluminescent display, or any other type of small display suitable for mounting in a portable computer or mobile device. Device 310 may be color or monochrome, and may include a backlight capability to enhance readability in various lighting conditions.

In an illustrative embodiment of the present invention, device 310 displays a web document 314 for access by a user. Web document 314 may include an input area 316 for selecting inputs related to the enhanced coverage choices or options and other related options. Web document may be a web page within an insurance entity operated website where the website displays information on one or more insurance product option(s) that have been determined to be suitable for the consumer based on their inputs and selections. Enhanced coverage options may include options designed by at least two tiers of enhanced coverage option selections, such as high, medium or low, or by dollar value such as $1000, $5000 and $10,000 or by color gold, silver and bronze, etc., such as shown in screen area 318. Each tier may be defined by a coverage limit amount. In embodiments, enhanced coverage option selections may be two or more upgrade types. Examples of upgrade types may include general categories such as general safety, including grab bars and non-slip floors, wheelchair accessible, including wider doors and accessible counter and sink levels, and enhanced lighting. Web document 314 is an example of an enhanced coverage option selection screen displayed on a graphical user interface. In accordance with illustrative embodiments of the present invention, selecting the enhanced coverage option will provide the insured with upgrade coverage including enhanced improvements for an insured property in the event of a claim or loss based on universal design principles. Web document 314 may also include an enhanced coverage example area 320 that may provide educational information related to the various enhanced coverage options or more specifically to the option selected and one or more examples of an exemplary improvement that may be made if there is a claim made with enhanced coverage in place. For example, as shown in screen 322, a property that sustains damages to a bathroom area may be upgraded as shown in screen 324 with a grab bar under universal design principles despite the fact that the original property shown in screen 322 did not have a grab bar. Other available upgrades may include raised front-loading dishwashers, side-by-side refrigerators, easy-access kitchen storage, low or no-threshold stall showers with built-in benches or seats, non-slip floors, bathtubs, and showers, raised, comfort-level toilets, multi-level kitchen countertops with open space underneath, easy to open and close windows, task lighting directed to specific surfaces or areas and easy-to-grasp D-shaped cabinet pulls among others. Thus, the available upgrades may include upgrades to personal property, such as refrigerators, as well as upgrades to fixtures, such as toilets and bathtubs. Upgrades may be applicable to homes and businesses and may also include consulting type services such as ergonomics or lifestyle consultants that may help arrange or organize a home or business in a more ergonomic or useful arrangement. Businesses may use the enhanced coverage option to upgrade walkways, bathrooms and other access areas in view of business regulations, state regulations and federal regulations as applicable.

Such enhanced coverages of the embodiments of the present invention may be associated with one or more parameters or conditions. In one variation, the enhanced coverages may apply to loss events affecting or occurring in all rooms and areas of an insured property. In other variations, the enhanced coverages may apply only to loss events affecting or occurring in rooms of a certain room type, such as insured property kitchens (kitchen room type) and insured property bathrooms (bathroom room type). Enhanced coverage upgrades or improvements may be limited to the damaged room and would only be applied above indemnification of loss and/or after the applicable deductible has been paid. Additionally, the enhanced coverage may provide a pre-payment of the coverage amount to the insured by the insurance company prior to incurring of upgrade costs or may only be paid when upgrade costs are incurred and after receipt by the insurance company of upgrade expense information, such as invoices or bills from one or more contractors who have performed services and provided materials related to the upgrade. Allowable costs may include fixture and labor costs in one embodiment up to the available coverage limits of the enhanced coverage but only once the primary or base policy coverage limit has been exhausted. For example, if the deductible is $500 and the base coverage is $10,000, only after the $500 is paid by the insured and the $10,000 has been exhausted in repairing the underlying damage will, for example, the $1500 enhanced coverage option apply. In other embodiments, the allowable costs may up to the available coverage limits of the enhanced coverage after payment of the deductible amount by the insured, even if the base coverage has not been exhausted in repairing the underlying damage.

Figure 4:
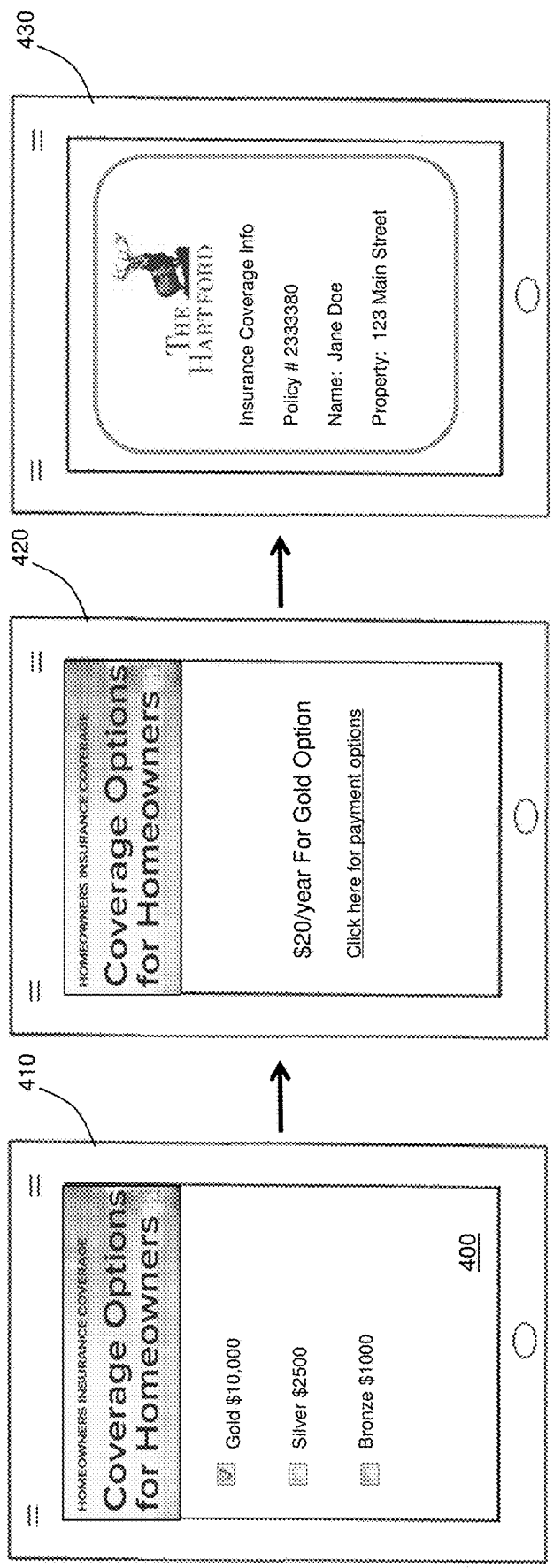
FIG. 4 shows an exemplary system device in operation.

Turning now to FIG. 4, an exemplary user device 400 is illustrated displaying a quotation process in accordance with an illustrative embodiment of the present invention. Device 400 displays a quotation web page or document 410 that may be generated by the insurance data system 110 shown relative to FIG. 1. Document 410 is configured to receive certain information and input on behalf of the user through a series of inputs provided on user device 400. Such information and input provided by the user is then stored such as in a data storage device described with respect to FIGS. 1 and 2. Web document 410 is configured to receive input from the user regarding their insurance profile such as in the case of home insurance, the address of the property they are seeking to insure, and the desired enhanced coverage option such as gold, silver and bronze option, each option corresponding to different levels of coverage limits for universal design based improvements in the event of a loss. Web document 410 thus serves as an enhanced coverage option selection screen on a graphical user interface. In operation, the user moves from one user input field to another form field to complete each selected data request or question displayed in each form field.

In an illustrative embodiment of the present invention, device 400 may be a touch sensitive display that is responsive to a finger, a stylus, etc. for manipulation and completion of form 410. Certain operating circuitry may control or operate device 400 to show different respective images, such as, for example, inputs, text instructions or information, icons or functions of a graphical user interface (GUI), lists of information, etc., as is known. Device 400 further is operative to display, responsive to receipt of a user selection of an enhanced coverage option selection, an insurance quotation for the user selected enhanced coverage option such as shown in screen display 420. The coverage options may be displayed for an insured who already has a base insurance policy for the insured property, or for a new prospective insured, or in connection with a renewal of an existing policy. Device 400 may be further operative to display one or more inputs for a user to select to signify user acceptance of a quotation. Upon receipt of data indicative of user acceptance of the quotation shown in screen display 420, the user may be provided an electronic insurance coverage information as shown in screen display 430. The system is thus operative to receive a communication to bind the enhanced coverage, such as an endorsement to a base insurance policy for the insured property. In embodiments, a total premium, which is a sum of a base premium for the underlying property coverage and the premium for the enhanced coverage premium, may be calculated and displayed for the user prior to binding of the policy and endorsement. The premium for the enhanced coverage upgrade may be fixed for a period, such as a yearly, semi-annual or other policy term. In other embodiments, the premium for the enhanced coverage upgrade may be variable. In embodiments, the enhanced coverage option is provided per incurred loss. Thus, a limit may for covered upgrades may be for each incurred loss. For a loss that affects both a bathroom and a kitchen, then only a single upgrade may be available. For a loss that affects a bathroom, and a separate loss under the same policy that affects a kitchen, upgrades would available for both the bathroom and the kitchen. In other embodiments, the limit for covered upgrades may be limited to a single upgrade per policy term or other time period, regardless of whether there are separate losses.

Figure 5:
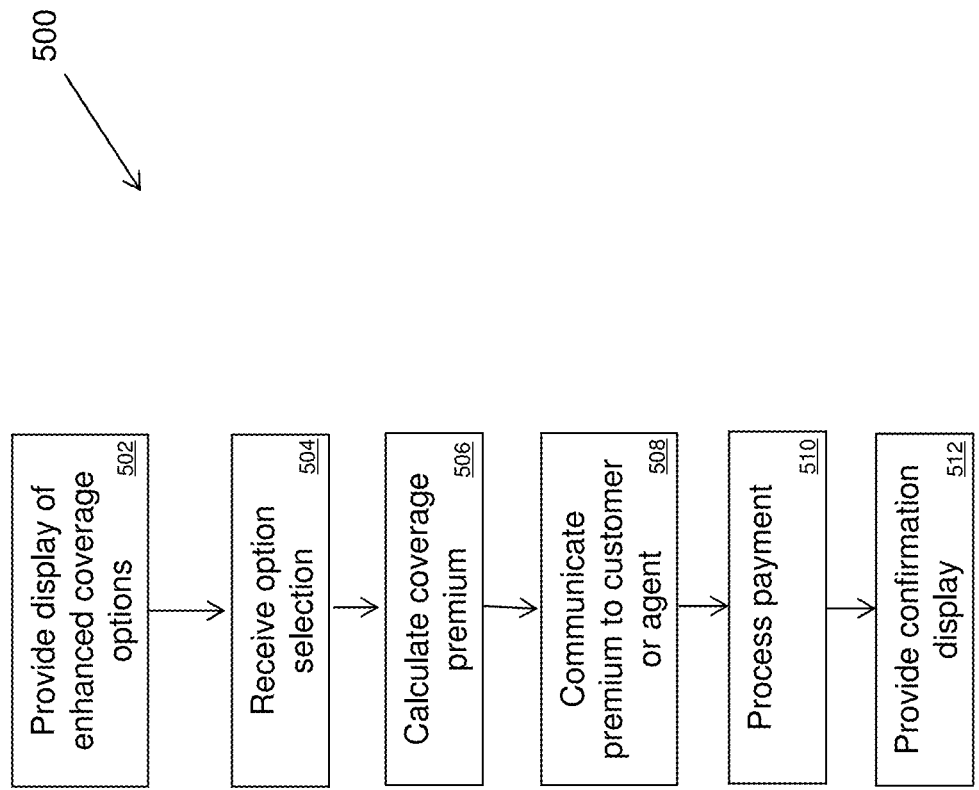
FIG. 5 shows an exemplary method of an illustrative embodiment of the present invention.

FIG. 5 shows an example process flow diagram illustrating a method 500 for administering an electronic enhanced coverage management process using the example architecture 100 of FIG. 1. The method 500 of FIG. 5 may begin by providing a display of enhanced coverage options available for an insured property, or a property that is the subject of an application for insurance, such as on a graphical user interface, step 502. The enhanced coverage options will provide the policyholder with universal design based improvements in the event of an incurred loss in varying limits of coverage. Method 500 continues with receiving a enhanced coverage option selection, such as a selection of one option at a certain dollar value level, step 504. Method 500 continues with calculating a premium for the enhanced coverage option selection, step 506. Method 500 proceeds with transmitting such as via the communications interface, the calculated premium to customer or agent, step 508. Method 500 continues with processing of payment for the calculated premium, step 510, where the total premium paid will be generally a combination of the base premium for an underlying property coverage and the premium for the enhanced coverage. The enhanced coverage may be an endorsement on the policy including the underlying property coverage. Method 500 proceeds with outputting an electronic insurance confirmation to the user, step 512. Electronic insurance confirmation may include a text message, email or web page that provides the customer or agent with policy information such as policy number, limits, deductibles, claim information, etc. as shown in FIG. 4.

In one example, a customer selects a $2500 enhanced coverage option and subsequently the customer has water damage in a bathroom in their insured property. The underlying property coverage will provide for repair/replacement of the water damage in the bathroom and the enhanced coverage will reimburse the insured customer to replace a previously undamaged existing standard height toilet with a comfort height toilet up to endorsement coverage limit and after the water damage deductible is met. Additionally, if an endorsement balance exists after payment of costs of the comfort height toilet, the customer can opt for other upgrades, i.e. shower grab bars or other universal design based improvements up to the limit of the enhanced coverage.

Figure 6:
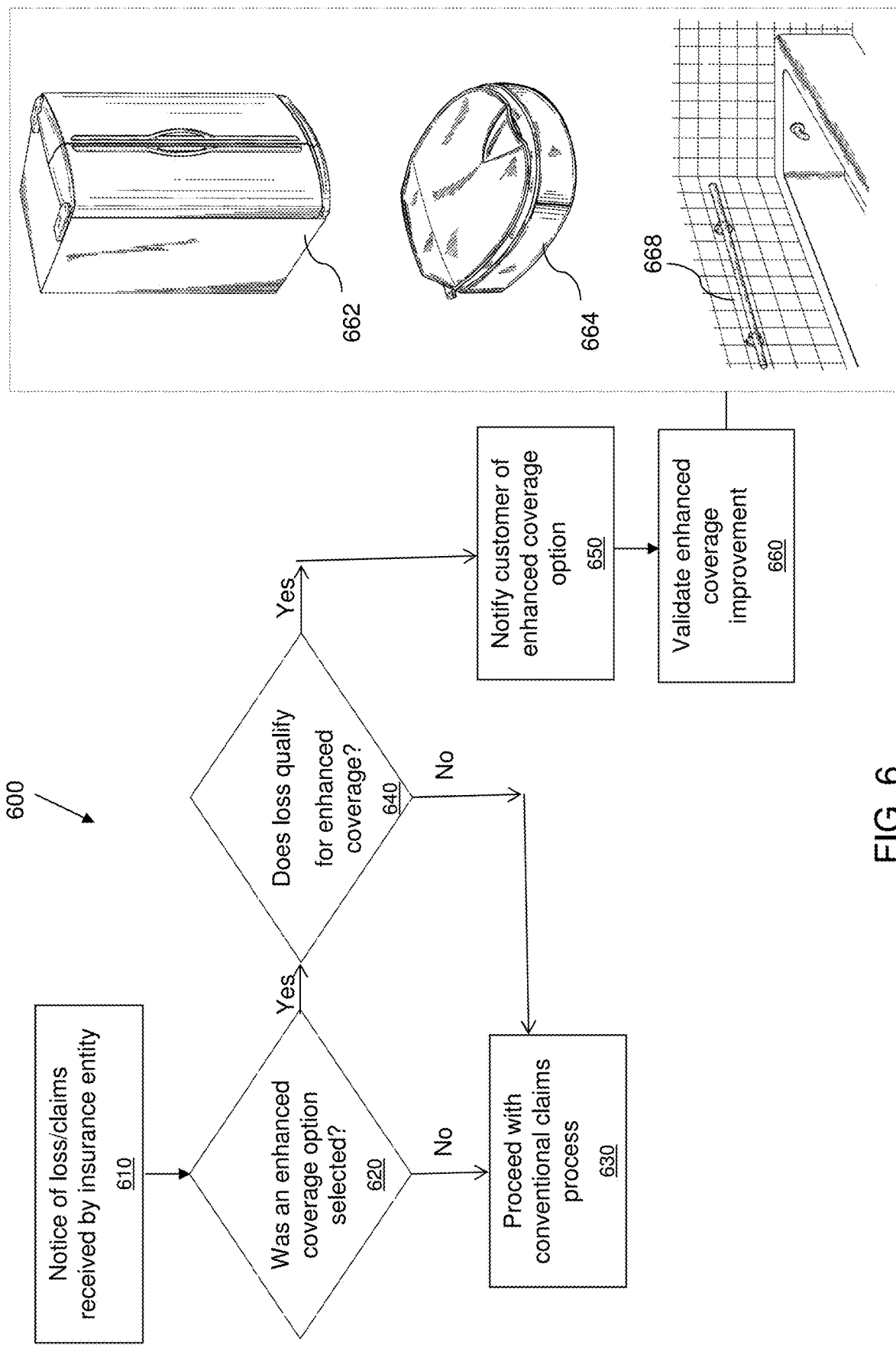
FIG. 6 shows another exemplary method of an illustrative embodiment of the present invention.

FIG. 6 shows a process flow diagram illustrating another computer implemented method 600 of an illustrative embodiment of the present invention. In an embodiment, a notice of loss/claim is received by an insurance entity, step 610. The notice of loss/claim may be a telephone call, electronic mail message or other communication from a customer, such as an individual insured individual, such as a property owner, a commercial insurance customer, such as an owner of a property used for business purposes, and/or an insurance agent. The customer may be a remote user of a system, such as a user of a user device providing claim information via a graphical user interface accessed via a network. The graphical user interface may be generated by a web-based claims sub-system of an insurance entity computer network. The notice of loss/claim may include property insurance data in connection with a loss event related to an insured property. The property insurance data may include address information, a room type or identification of a room or rooms, where the loss was incurred, a type of damage, pictorial data, time and date of discovery or occurrence of damage, and other data. It is determined then, if an enhanced coverage option was selected and is included in the current term of the policy to which the notice of loss/claim applies, step 620. Determination may be accomplished by checking a insurance information database of policyholder and policy coverage options to determine if any of the policy coverage options such as an enhanced coverage option or endorsement applies to the current policy under which the current loss/claim is submitted. If the enhanced coverage option was not selected, the method proceeds with processing the loss/claim in a conventional manner, step 630. A claim may proceed in a conventional manner by having an insurance adjuster inspect the damage, and the insured receiving compensation to only repair/replace the damaged area of the property. If an enhanced coverage option was selected, then it is determined if the loss/claim qualifies for, or is eligible for, the enhanced coverage, such as an upgrade, step 640. Determining if the loss/claim qualifies for the enhanced coverage may be accomplished by verifying if information received as part of the notice of loss/claim qualifies under certain business rules such as if the loss relates, at least in part, to a certain area or part of the property, such as a covered room type, that is covered under the enhanced coverage. If it is determined that the loss does not qualify for enhanced coverage, then the method proceeds with processing the loss/claim in a conventional manner, step 630. If it is determined that the loss does qualify for enhanced coverage, then the customer is notified of the enhanced coverage option, step 650. Notification may be via an electronic mail message, text message, display on a graphical user interface on a user device of a remote user, telephone call, letter or otherwise. For example, after notification from an insured customer at the time of a property based loss such as in the kitchen or bathroom, the insurance entity, such as through an insurance call center or claims adjuster may notify that customer that in addition to covering the underlying damage, the policy will also cover better living design upgrades in a damaged covered room up to the coverage limit of the enhanced coverage option originally selected by the insured such as, for example, a $1000, $2500 and $5000 coverage limit. In embodiments, an insurance company workflow may cause a notification to be directed by mail, recorded voice message, text or otherwise to an insured that one or more claims representatives are available to provide real-time information and answers to questions regarding available upgrades. In embodiments, an insured may be provided access to an automated system, such as via a link or within a login on an insurance company website, that is pre-loaded with information regarding the covered loss and the coverage, and can provide such data as listings of available upgrades, reasonable costs for the upgrades, and other information. Insurance company computer systems may be configured to provide claims representatives with such information on screens to reference during calls with insureds. In embodiments, the insurance company systems may be configured to receive an insured selection of an upgrade and provide pre-approval of a claim for the upgrade up to the coverage limit or a reasonable amount for the upgrade. As noted below, reasonable amounts for upgrades may be stored in one or more databases. Reasonable amounts for upgrades may vary by geographical factors, based on cost of labor, for example, which varies by geographic area.

The insured may then arrange for one or more upgrades or improvements in accordance with universal design principles. An insurance entity system may receive additional insurance claims data. The additional insurance claims data may be data indicative of upgrade expense information. The upgrade expense information may include invoice data from one or more contractors who have provided upgrades to an undamaged items in accordance with universal design principles. The method continues with a validation of the enhanced coverage improvement, step 660, such as an improvement of a side by side refrigerator 662, a raised height toilet seat 664 or a grab bar 668. Validation may be accomplished by determining if the improvement qualifies under certain business rules and parameters such as rules related to universal design considerations, insurance company guidelines, state rules or otherwise. Validation may include reviewing contractor and vendor bills and invoices for the upgrade performed or purchased. The validation may include determining whether the contractor and vendor bills and invoices constitute reasonable additional upgrade costs. In embodiments, the validation may include accessing a database having reasonable cost figures associated with types of upgrades, comparing the amounts of bills and invoices are not more than the reasonable cost figures, and then approving claims for payment up to the greater of the amount of submitted bills and invoices and the stored reasonable cost figures. Validation may also include reviewing pictorial data received from the policyholder after the improvement or upgrade is made to determine whether or not the improvements shown in the pictorial data are of a covered upgrade type and are consistent with the bills and invoices. For example, validation may be used to prevent fraud or unauthorized improvements undertaken by a policyholder.

The step of validation results in a determination either that the expenses are payable in full, that the expenses are payable in part, or that the expenses are not payable. In embodiments, a system process may provide expense data to a live employee or to a fraud determination module or system, based on one or more rules. After validation of the upgrade expenses, if a result of validation is for payment in full or in party, the system may generate instructions for payment to the insured in accordance with submitted expenses, deductibles and coverage limits. In addition, a notification may be provided to the insured of the result of the validation step and the reasons for determination that the expenses are payable only in part or not at all, by any mode of communication. The payment may be made by check, ACH transaction, wire transfer by a banking entity or otherwise.

In embodiments, the validation step may be independent from processing of a claim for the underlying loss. For example, insurance company systems may be configured to review and process a claim for the underlying loss and provide a cash payment (or payment via check, ACH or other suitable manner) to the insured upon receipt, review and approval of documentation of the loss. The validation of the upgrade may take place independently in time. By way of example, the method 600 may further include as part of validation a step of determining whether the claim for an upgrade has been submitted within a stored term following the date of occurrence of the loss. The stored term is set by the base insurance policy, and may be one, two or three years following occurrence of the loss, in embodiments. In embodiments, a system of an insurance company may be configured to provide a notification to an insured, upon or within a time period after payment of, or another step in an insurance workflow, such as approval, a claim for repair/replacement on a loss for which an upgrade is available, that the upgrade is available. In embodiments, more than one notification may be provided.

One or more steps of method 600 may be implemented as computer program instructions provided on a non-transitory computer readable medium for execution by one or more processors. As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Figure 7:
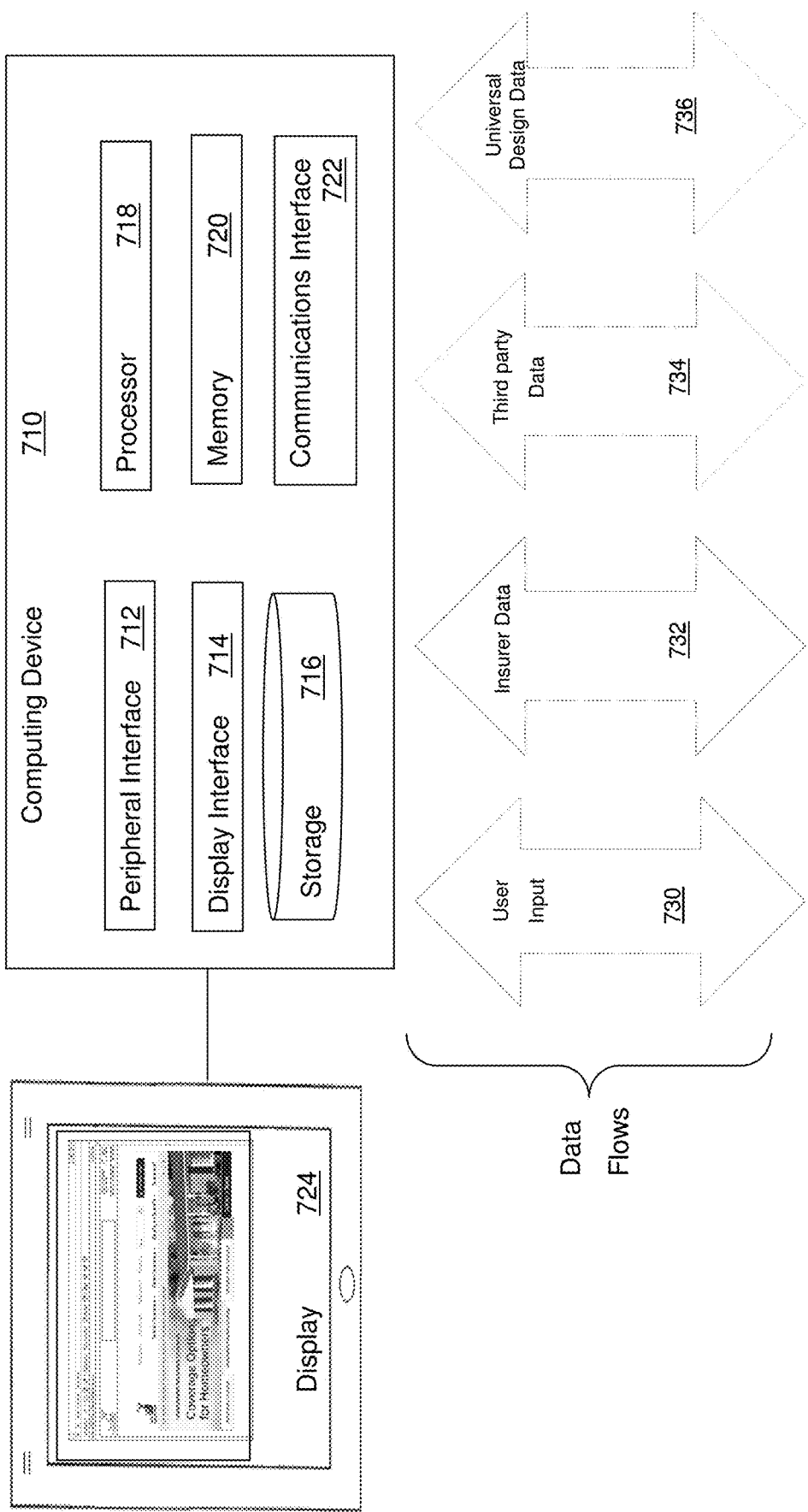
FIG. 7 shows another exemplary device of an illustrative embodiment of the present invention.

FIG. 7 shows an example computing device 710 that may be used to implement features describe above. The computing device 710 may include a peripheral device interface 712, display device interface 714, a storage device 716, a processor 718, a memory device 720, and a communication interface 722. Computing device may be coupled to a display device 724, which may be separately coupled to or included within the computing device 710. In operation, computing device 710 is configured to receive and transmit a number of data flows via communications interface 722 including, for example, user data 730, insurer data 732, third party 734 and universal design data 736.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712.

The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 700.

The memory device 720 of FIG. 7 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by the consumer client device 130 as described with respect to FIG. 1. In such an instance, the memory device 720 and/or the storage device 716 may store instructions which, when executed by the processor 718, cause the processor 718 to perform any feature or any combination of features described above as performed by the web browser module 134. Alternatively or additionally, in such an instance, each or any of the features described above as performed by the web browser module 134 may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the insurance data system 110. In such an instance, the memory device 720 and/or the storage device 716 may store instructions which, when executed by the processor 718, cause the processor 718 to perform any feature or any combination of features described above as performed by the interface module 112 and/or the calculation module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the product management system 160. In such an instance, the memory device 720 and/or the storage device 716 may store instructions which, when executed by the processor 718, cause the processor 718 to perform any feature or any combination of features described above as performed by the product management system 160. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the financial web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Figure 8:
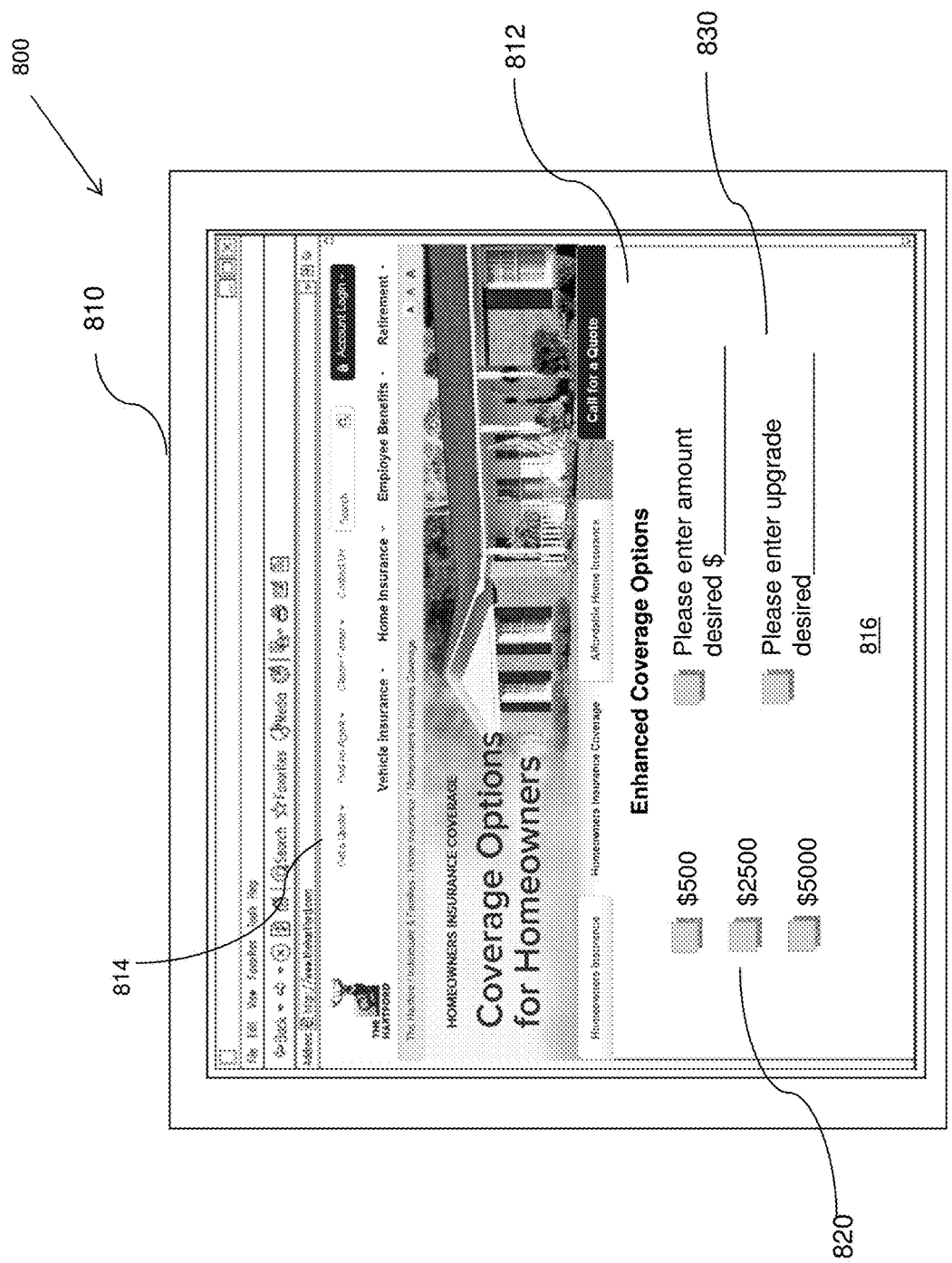
FIG. 8 shows another exemplary device of an illustrative embodiment of the present invention.

Referring now to FIG. 8, illustrated is an exemplary screen 800 displaying an enhanced coverage option selection screen on a graphical user interface in an illustrative embodiment of the present invention as may be displayed among devices shown in FIGS. 1 and 2. In one embodiment, a user operates a device 810, such as a user terminal or portable computing device for viewing and accessing information and data related to insurance policy enhanced coverage options as described herein. Device 810 may include a touch screen 812 that can be an active sensor employing capacitive, resistive, inductive, or other methods, or it can be a passive surface on which touch sensing is accomplished by optical, acoustic, or other similar methods. Device 810 can also be a liquid crystal display (LCD), organic light emitting diode (OLED) display, electroluminescent display, or any other type of small display suitable for mounting in a portable computer or mobile device. Device 810 may be color or monochrome, and may include a backlight capability to enhance readability in various lighting conditions.

In an embodiment of the present invention, device 810 displays a web page 814 for access by a user. Web page 814 may include an input area 816 for selecting inputs related to the enhanced coverage choices or options such as options and other related options. Web page may be a page within an insurance entity operated website where the website displays information on one or more insurance product option(s) that have been determined to be suitable for the user, consumer or agent based on their inputs and selections. Enhanced coverage options may include pre-defined options designed by level such as high, medium or low, or by dollar value such as $500, $2500 and $5000 or by color gold, silver and bronze, etc. such as shown in section 830. In other embodiments, one or more of the enhanced coverage options may include a user definable or customizable option that allows the user or customer to define one or more terms or features of the enhanced coverage option. In the disclosed embodiment, the user definable term is a coverage limit such as a limit of $2750, a limit of $8000 or other user definable limit such as shown in screen area 830. In other embodiments, the user definable term may be a particular upgrade or class or category of upgrades. In embodiments, the particular upgrade or class or category of upgrades may be in addition to or instead of a dollar limit, or may be subject to the dollar limit. For example, the user may specify that they desire a different counter height in the case of damage to their kitchen or handrails in their bathroom in the case of a loss to their bathroom area. In this embodiment, the system would calculate a dollar value limit option selection based on the desired upgrade. In accordance with illustrative embodiments of the present invention selecting the enhanced coverage option will provide the insured with enhanced improvements in the event of a claim or loss based on universal design considerations.

In embodiments, a system may be configured to display for the user an option of a selection of one or more rooms for an enhanced coverage option. By way of example, the system may be configured to display a user option to select a kitchen, all bathrooms of the house, one bathroom of the house, other rooms, or one or more combinations of available rooms. In these embodiments, the system may be configured to calculate a premium based on the user selection of rooms. In embodiments, the system may be configured to provide the user with an option to select one or more upgrades other than upgrades to a selected room. By way of example, the system may be configured to provide the user with an option to select an exterior improvement. Examples of exterior improvements include ramps suitable for wheelchairs, improved lighting on walkways and stairs, improved surfaces for walking, by way of example. By way of further example, the system may be configured to provide the user with an option to select an interior improvement not limited to an affected room. By way of example, such an interior improvement may include improved lighting in stairs, hallways, and elsewhere, improved or added handrails in stairways, hallways and elsewhere, non-skid surfaces on stairs, hallways and elsewhere, and other improvements.

Any of the options discussed above in connection with FIG. 8 may be combined with one another in any combination in embodiments. The system may be configured to provide user options by providing drop down menus of available options, text boxes or in other manners.

Figure 9:
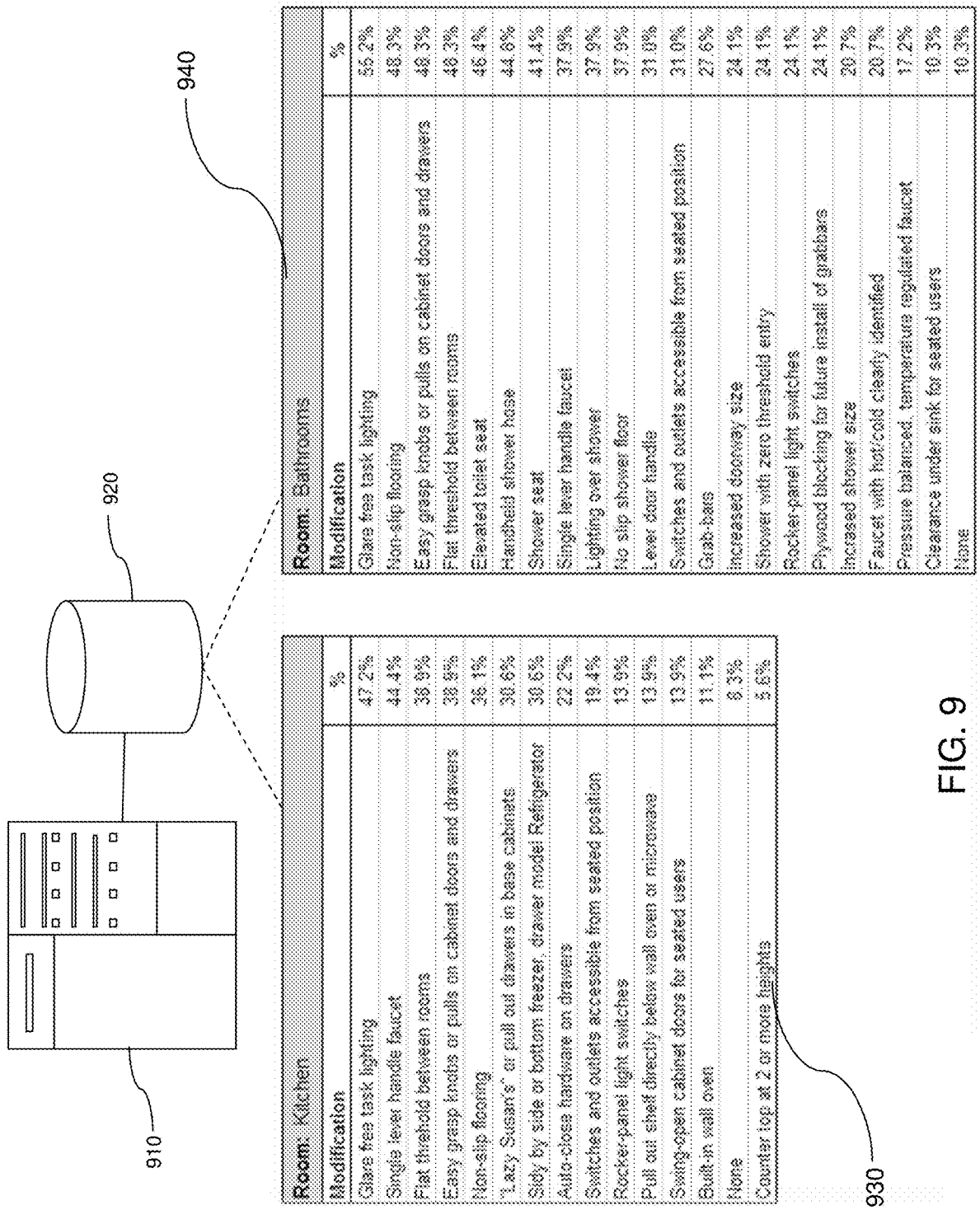
FIG. 9 shows another exemplary system of an illustrative embodiment of the present invention.

FIG. 9 illustrate an insurance company entity system 900 that includes an insurance company entity controlled server 910 and an associated data storage device 920. Data storage device 920 may be a conventional storage device or a conventional network storage environment based on a traditional physical storage servers that includes non-volatile mass storage devices. Data storage device 920 may also be a public or a private, professionally administered, high-capacity cloud running various "virtual machine" (VM) servers. The cloud may be based on redundant, highly reliable infrastructure with replicated storage and load and performance management to store insurance company related information such a policy and property information and information related to better living or universal design upgrades, modifications and improvements, which may be associated with room types such as a kitchen room type or a bathroom room type, such as shown in databases 930 and 940. In embodiments, the database may be accessed in connection with generation of policy documents, such as for generation of a listing of available upgrades for inclusion in a policy endorsement, and in validation of upgrade expense information, such that the system will validate only expense information corresponding to a room type and a modification associated with the room type as stored in the database. In embodiments, in response to a determination that a loss event is eligible for coverage under an enhanced coverage endorsement, a system may access and provide in a communication to an insured or a representative of an insured a listing of available upgrades from databases 930 or 940. The insured may then receive the listing of available covered upgrades prior to contracting for upgrades. In embodiments, a system may generate a web form with a user-selectable list of available upgrades from databases 930 or 940, depending on room type of the loss event, in connection with submission of upgrade expense information, such as via a web-based claims sub-system.

In embodiments of the system, the system may be configured to add modifications to the database of FIG. 9 as new types of improvements are approved by the insurer's claims operation. For example, an insured may identify an upgrade to an affected room that meets the requirements of universal design by rendering use of the room or a fixture in the room safer, more accessible or easier to use. By way of illustrative example, a vanity may be in good condition but have doors that are difficult for an individual with hand injuries or conditions such as arthritis to operate; replacement of a vanity with difficult doors to open will render the bathroom more accessible and easier to use, and thus meet the requirements for universal design principles. Upon review and approval by a claims operation, such an improvement may be added to the database of FIG. 9.

In embodiments, a database of FIG. 9 may include a list of modifications or improvements that fail to meet the requirements of universal design. By way of example, a replacement of a microwave oven with a microwave oven that differs only in available power would not qualify as an improvement that meets universal design principles. On the other hand, replacement of a microwave oven with a new microwave oven having higher contrast and larger size of numbers on a keypad would meet the requirements of universal design principles.

Referring to FIG. 10, a table is shown that represents an enhanced coverage insurance database 1000 that may be stored, for example, within database 116 shown in FIG. 1 or database 224 shown in FIG. 2 Database 1000 may include, for example, entries identifying certain data and information related to administering and managing enhanced coverage options for policyholders. For example, database may also define fields 1010, 1020, 1030, 1040, 1050, 1060 and 1070 for each of the entries in the database 1000. The fields 1010, 1020, 1030, 1040, 1050, 1060 and 1070 may, according to some embodiments, specify: a property identification 1010, an enhanced coverage option identifier 1020, an enhanced coverage limit amount 1030, a base coverage amount 1040, an applicable deductible amount 1050, an available enhanced coverage amount 1060 and an applicable premium 1070. The enhanced coverage insurance database 1000 may be created and updated on a periodic basis or in real time as information related to the fields of the property identification 1010, the enhanced coverage option identifier 1020, the enhanced coverage limit amount 1030, the base coverage amount 1040, the applicable deductible amount 1050, the available enhanced coverage amount 1060 and the applicable premium 1070 become available or change as claims occur and policies are updated, renewed, cancelled, etc.

Referring still to FIG. 1000, the property identification 1010 may be an address or other identifying indicia such as policy number that identifies a particular insured property. The enhanced coverage option identifier 1020 may be an insurance company particular alphanumeric code identifying a particular enhanced coverage option that corresponds to a certain enhanced coverage limit amount 1030, or may be an industry standard. The base coverage amount 1040 may be an amount corresponding to a base coverage for the property identified in 1010 with an applicable deductible amount 1050. The available enhanced coverage amount 1060 is an amount that depends on the enhanced coverage limit 1030, the base coverage amount 1040 and the deductible 1050 as well as any prior claims that may have used all or a portion of the enhanced coverage limit 1030. The available enhanced coverage amount 1060 may be calculated by determining if the base coverage amount 1040 has been used up and corresponding deductible 1050 has been paid and then taking the enhanced coverage limit and subtracting any prior claim amounts paid under the option to determine the enhanced coverage limit amount as may be represented by (Enhanced Coverage Limit−Enhanced Coverage Limit Used for Prior Claims)=Available Enhanced Coverage Amount (subject to deductible payment and base coverage usage). For example, in row 1080, property 567 Hartford Ave with a base coverage of $25,000, a $500 deductible and a $2500 enhanced coverage limit with an applicable yearly premium of $44. In this example, the property had a prior claim that exhausted the $2500 enhanced coverage limit and thus the available enhanced coverage limit is now $0. In other embodiments, the enhanced coverage limit may apply to all losses under the property or apply per incurred loss.

In embodiments, a total premium, which is a sum of a base premium for the underlying property coverage and the premium for the enhanced coverage premium, may be calculated and displayed for the user prior to binding of the policy and endorsement. The premium for the enhanced coverage upgrade may be fixed for a period, such as a yearly, semi-annual or other policy term. In other embodiments, the premium for the enhanced coverage upgrade may be variable.

In embodiments, upgrade coverage for upgrades in accordance with universal design principles may be available for commercial property insurance. In embodiments, upgrades may be available for a same room that is the subject of a loss. Examples applicable to homeowners insurance may be applicable to rooms covered by a commercial insurance policy, such as bathrooms. In embodiments, coverage may be provided to provide upgrades to provide for compliance with local, state or national rules and regulations applicable to safety, accessibility or other factors. In embodiments, the commercial insurance coverage may apply to areas within a commercial building, such as hallways, lobbies, reception areas, bathrooms, break rooms, kitchens, conference rooms, retail floor areas, open warehouse areas, and other areas. Insureds under commercial policies in embodiments may select coverages as illustrated and discussed in connection with FIG. 8. Options may differ for commercial policies; for example, different areas that may be the subject of upgrades may be provided. Types of available upgrades may include installation of handrails, widening of doors, upgrades to lighting, upgrades/modifications to flooring, installation of accessible door handles, moving of light switches and changes to light switches, and other modifications. The modifications available for commercial policies may be the same as or different from those for homeowners policies. The insurance company systems may be provided with look up tables for premiums for commercial policies, with validation procedures for commercial policies and other features as described herein with reference to homeowners policies.

While illustrative embodiments of the present invention have been described to cover one or more upgrades, enhancements or improvements in accordance with universal design principles to homes and businesses as part of a home insurance policy or a business owner's policy the present invention may be applied to an automobile insurance context to provide for upgrades, enhancements and improvements in accordance with universal design principles to a motor vehicle in the event of a loss. For example, if an automobile is involved in an accident and sustains damage to its front end, an enhanced coverage option in this instance would allow the insured individual, for example, to upgrade their automobile with a rear view camera, a step for a minivan or small truck, a heated seat (helpful for those with back injuries or conditions), upgraded door handles, or other similar upgrade, enhancement or improvement in accordance with universal design principles under the applicable enhanced coverage policy limit. In embodiments, the user may be presented with options similar to those illustrated in connection with FIG. 8 and discussed in connection with FIG. 8. Thus, options may include maximum coverage amounts for upgrades, selections of types of upgrades or categories of upgrades to an automobile may be made available. The insurance company systems may be provided with look up tables for premiums for automobile policies, with validation procedures for automobile policies and other features as described herein with reference to homeowners policies. In embodiments, limitations on selections of upgrades may differ with respect to automotive policies; for example, validation and processing rules may require that upgrade repairs be performed at the same time as other repairs associated with a loss.

The determination of premiums will now be discussed. In embodiments, an insurance company may determine premiums for coverage initially by determining frequency for applicable rooms. Thus, in an embodiment in which homeowners policies may provide coverage for upgrades to kitchens and bathrooms only, a kitchen and bath frequency may be determined. The kitchen and bath frequency may be determined as the product of total claim frequency from claim data, multiplied by a ratio of claims affecting the kitchen or bathroom to total claims. The total claim frequency may a percentage of total properties having a claim in a given year to the total number of properties insured. Thus, kitchen and bath frequency may be determined by:

$$KitchenandBathFrequency = (TotalClaimFrequency) \times (KitchenandBathRatio)$$

By way of example, the average total claim frequency for a three year period may be 10%. The kitchen and bath ratio, that is, the percentage of claims involving damage to a kitchen or bath, average for the same three year period may be 20%. The resulting kitchen or bath frequency is 2%.

A loss cost per policy may then be determined for available limits that may be offered to the policyholder. The loss cost per policy may be determined by multiplying the limit by the kitchen and bath frequency. An expense load may then be determined or accessed. An expense load may be a value indicative of the expense of processing a claim. A discount factor may be determined. The discount factor may be a sum of anticipated claims triggered and not exercised and claims less than the limit. The indicated average premium may then be calculated as follows:

$$IndicatedAverage\ Premium = (LossCost) \times (ExpenseLoad) \times (TotalDiscountFactor)$$

For $1000 limit and a kitchen and bath frequency of 2%, the loss cost is $20.00. For an expense load of 2.0, a total discount factor of (100%−10%−10%=80%) (based on not exercised claims of 10% and claims less than the limit of 10%), the indicated average premium is $32.00.

The indicated average premium may then be adjusted by a base rate discount, which adjusts for program variation. The base rate discount may be set in the range between 80% and 100%, for example, and applied to the indicated average premium to determine an indicated base premium. A selected average premium may be obtained by rounding to provide a round dollar figure.

Although the methods and features described above with reference to FIGS. 1-10 are described above as performed using the example architecture 100 of FIG. 1 and the example system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-10 may be used alone without the other features and elements or in various combinations with or without other features and elements. Sub-elements of the methods and features described above with reference to FIGS. 1-10 may be performed in any arbitrary order (including concurrently), in any combination or sub-combination.

What is claimed is:

1. A computer system, the system comprising:
a web site computer system comprising one or more processors, a memory coupled to the one or more processors, and one or more programs stored in the memory and configured to be executed by the one or more processors, the instructions causing the one or more processors to perform the steps of:
generating for display on and communicating to a client device a graphical user interface including a web document including an enhanced coverage option selection screen area displaying a plurality of user-selectable enhanced coverage options corresponding to at least a first type and a second type of enhanced coverage option selections, selectable to transmit a selection to the web site computer system;
receiving data indicative of an enhanced coverage option selection input via the web document from the graphical user interface;
causing the graphical user interface to display, responsive to user selection of the first type of enhanced coverage option selections, a plurality of alternating images, including an image of a damaged property and an image of the damaged property after repair and upgrade according to universal design principles in accordance with the first type of enhanced coverage, and, responsive to user selection of the second type of enhanced coverage option selections, a plurality of alternating images including an image of a damaged property and an image of the damaged property after repair and upgrade according to universal design principles in accordance with the second type of enhanced coverage, the first type enhanced coverage option and the second type enhanced coverage option each providing, responsive to a loss covered under a base property insurance policy, the loss affecting a portion of the property covered under the base property insurance policy, upgrade coverage based on universal design principles for the affected portion, the upgrade coverage providing one or more improvements to the affected portion, the one or more improvements being in accordance with universal design principles;

a claims management computer system in communication with the web site communication system, comprising one or more management systems processors, a management system memory coupled to the one or more management system processors, and one or more management system programs stored in the management system memory and configured to be executed by the one or more management system processors, the instructions causing the one or more management system processors to perform the steps of:

receive, from a user via a remote device, property insurance data submitted electronically in connection with a loss event related to an insured property covered by a policy issued responsive to selection of one of the first type enhanced coverage option and the second type enhanced coverage option, the property insurance data including data identifying a portion of the insured property affected by the loss event;

determine, based on stored data relating to the policy, whether the loss event qualifies for repair and upgrade according to universal design principles in accordance with the enhanced coverage option, the determining including determining whether the affected portion is a portion type eligible for repair and upgrade;

responsive to determining that the loss event qualifies for repair and upgrade according to universal design principles, communicate to the user that the loss event qualifies for repair and upgrade;

receive upgrade expense information from the user;

validate the received upgrade expense information, the validating including determining whether the upgrade expense information is indicative of an upgrade in accordance with universal design principles; and responsive to determining in the validating that the upgrade expenses of the upgrade expense information are payable at least in part under the policy, generate instructions for payment to the user in accordance with the received expense information.

2. The computer system of claim 1, wherein the received insurance data comprises an indication of a portion of the property affected by the loss event, the determining comprising determining whether the affected portion relates to a type of property portion covered under the enhanced coverage option.

3. The computer system of claim 2, wherein the policy is a homeowners insurance policy, and the type of property portion covered under the enhanced coverage option is one of a kitchen room type or a bathroom room type.

4. The computer system of claim 2, wherein the policy is a business insurance policy, and the type of property portion covered under the enhanced coverage option is an access area.

5. The computer system of claim 4, wherein the access area is one of a walkway and a bathroom.

6. The computer system of claim 1, wherein the upgrade expense information is related to one or more of bathroom grab bars, single handle faucets, overhead lighting, non-slip flooring, step-in bathtubs, and comfort height toilets, and the validating includes determining that the upgrade expense information is indicative of an upgrade in accordance with universal design principles.

7. The computer system of claim 1, wherein the upgrade expense information comprises invoice data from one or more contractors who have provided upgrades to an undamaged items in accordance with universal design principles.

8. The computer system of claim 1, wherein the validation comprises accessing a database storing reasonable cost figures associated with types of upgrades, comparing amounts of invoices included in the received upgrade expense information to the stored reasonable cost figures, and then approving claims for payment up to the lesser of the amounts of the invoices and the stored reasonable cost figures.

9. The computer system of claim 1, wherein the validating comprises determining that the upgrade expenses are payable subject to an upgrade coverage limit and exhaustion of a base coverage amount for the loss event.

10. The computer system of claim 1, further comprising an insurance data system comprising a premium calculation module comprising one or more insurance data processors, an insurance data memory in communication with the insurance data processors and storing processor-executable instructions, which cause the one or more insurance data processors to perform the steps of:

receiving from the web site system data indicative of the enhanced coverage option selection;

storing the enhanced coverage option selection in a storage device;

determining a premium for the enhanced coverage option selection; and communicating, via a communications network, the determined premium for the enhanced coverage option selection to the web site system for generating images for display on the graphical user interface incorporating the determined premium.

11. A computer-implemented method, comprising:

generating by a web site system for display on and communicating to a client device for a graphical user interface including in a screen area a display of enhanced coverage options, corresponding to at least a first type and a second type of enhanced coverage options, available for a covered property, each of the enhanced coverage options providing one or more improvements to a property covered under a property insurance policy, in accordance with universal design principles, in the event of an incurred loss to the covered property, each of the enhanced coverage options being selectable to transmit a selection, receiving, via a computer communications network, data indicative of a user selected enhanced coverage option made via the graphical user interface;

in a separate enhanced coverage example screen area, responsive to receipt of a user selection of the first type of enhanced coverage option, by the web site system, causing the graphical user interface to display a plurality of alternating images including an image of a damaged property and an image of the damaged property after repair and one or more improvements in accordance with universal design principles corresponding to the first type of enhanced coverage option, and responsive to receipt of a user selection of the second type of enhanced coverage option, by the web site system, causing the graphical user interface to display a plurality of alternating images including an image of an affected area of a damaged property and an image of the affected area of the damaged property after repair and one or more improvements in accordance with universal design principles corresponding to the second type of enhanced coverage option;

receiving, by a claims management computer system in communication with the web site computer system, from a user via a remote device, property insurance data submitted electronically in connection with a loss event related to an insured property covered by a policy issued responsive to selection of one of the first type enhanced coverage option and the second type enhanced coverage option, the property insurance data including data identifying a portion of the insured property affected by the loss event;

determining, by the claims management computer system, based on stored data relating to the policy, whether the loss event qualifies for repair and upgrade according to universal design principles in accordance with the enhanced coverage option, the determining including determining whether the affected portion is a portion type eligible for repair and upgrade;

responsive to determining that the loss event qualifies for repair and upgrade according to universal design principles, communicating, by the claims management computer system, to the user, that the loss event qualifies for repair and upgrade;

receiving, by the claims management computer system, upgrade expense information from the user;

validating, by the claims management computer system, the received upgrade expense information, the validating including determining whether the upgrade expense information is indicative of an upgrade in accordance with universal design principles; and responsive to determining in the validating that the upgrade expenses of the upgrade expense information are payable at least in part under the policy, generating by the claims management computer system, instructions for payment to the user in accordance with the received expense information.

12. The computer-implemented method of claim 11, wherein each type is a tier defined by a coverage limit amount, and the validating comprises determining an amount payable based on whether a total expense in the upgrade expense information is no greater than the coverage limit amount associated with the tier.

13. The computer-implemented method of claim 12, further comprising, by the web site system, providing at least three tiers of enhanced coverage options, each tier being defined by successively increasing coverage limit amounts.

14. The computer-implemented method of claim 11, wherein the property insurance data further includes an identification of an affected room or rooms and pictorial data.

15. The computer-implemented method of claim 11, wherein the determining whether the loss event qualifies for repair and upgrade according to universal design principles in accordance with the enhanced coverage option comprises determining whether the received insurance data is indicative of the affected portion being a covered room type.

16. The computer-implemented method of claim 11, wherein communicating, by the claims management computer system, to the user, that the loss event qualifies for repair and upgrade, comprises notifying the user that the policy covers upgrades to the affected portion up to a coverage limit of the selected enhanced coverage option type.

17. The computer-implemented method of claim 11, further comprising providing the user access to an automated system, via a web site system, preloaded with information regarding listings of available upgrades and reasonable costs for the available upgrades.

18. The computer-implemented method of claim 11, further comprising receiving, by the claims management system, a selection from the user of an upgrade, and, responsive to receipt of the selection, providing pre-approval up to a lesser of a coverage limit associated with a selected enhanced coverage option type or a stored reasonable amount for the selected upgrade.

19. The computer-implemented method of claim 11, wherein the received upgrade expense information relates to an upgrade of an item not damaged in the loss event.

20. The computer-implemented method of claim 11, further comprising:
  by an insurance data system comprising a premium calculation module, receiving from the web site system data indicative of the enhanced coverage option selection;
  storing the enhanced coverage option selection in a storage device;
  determining, by the insurance data system, a premium for the enhanced coverage option selection; and
  communicating, via a communications network, the determined premium for the enhanced coverage option selection to the web site system for generating images for display on the graphical user interface incorporating the determined premium.

* * * * *